United States Patent
Lee et al.

(10) Patent No.: US 10,514,685 B2
(45) Date of Patent: Dec. 24, 2019

(54) AUTOMATIC RECIPE STABILITY MONITORING AND REPORTING

(71) Applicant: KLA-Tencor Corporation, Milpitas, CA (US)

(72) Inventors: Hucheng Lee, Cupertino, CA (US); Lisheng Gao, Morgan Hill, CA (US); Govindarajan Thattaisundaram, San Jose, CA (US)

(73) Assignee: KLA—Tencor Corp., Milpitas, CA (US)

(*) Notice: Subject to any disclaimer, the term of this patent is extended or adjusted under 35 U.S.C. 154(b) by 296 days.

(21) Appl. No.: 14/736,250

(22) Filed: Jun. 10, 2015

(65) Prior Publication Data
US 2015/0362908 A1    Dec. 17, 2015

Related U.S. Application Data (60) Provisional application No. 62/012,164, filed on Jun. 13, 2014.

(51) Int. Cl.
G05B 19/418    (2006.01)

(52) U.S. Cl.
CPC ............ *G05B 19/41875* (2013.01); *G05B 2219/32196* (2013.01); *G05B 2219/32222* (2013.01);
(Continued)

(58) Field of Classification Search
CPC .... G05B 19/41875; G05B 2219/37224; G05B 2219/45031; G05B 23/0216;
(Continued)

(56) References Cited

U.S. PATENT DOCUMENTS

| | | | |
|---|---|---|---|
| 5,841,893 A * | 11/1998 | Ishikawa | G01N 21/88 382/145 |
| 6,313,903 B1 * | 11/2001 | Ogata | H01L 21/67178 118/52 |

(Continued)

FOREIGN PATENT DOCUMENTS

| | | |
|---|---|---|
| CN | 101903835 | 12/2010 |
| CN | 102435616 | 5/2012 |

(Continued)

OTHER PUBLICATIONS

Written Opinion of the International Searching Authority for PCT/US2015/035406 dated Sep. 30, 2015.
(Continued)

*Primary Examiner* — Crystal J Barnes-Bullock
(74) *Attorney, Agent, or Firm* — Ann Marie Mewherter (57) ABSTRACT

Systems and methods for monitoring stability of a wafer inspection recipe over time are provided. One method includes collecting inspection results over time. The inspection results are generated by at least one wafer inspection tool while performing the wafer inspection recipe on wafers at different points in time. The method also includes identifying abnormal variation in the inspection results by comparing the inspection results generated at different times to each other. In addition, the method includes determining if the abnormal variation is attributable to the wafers, the wafer inspection recipe, or one or more of the at least one wafer inspection tool thereby determining if the wafer inspection recipe is stable over time.

25 Claims, 3 Drawing Sheets

(52) U.S. Cl.
CPC ..... *G05B 2219/37224* (2013.01); *Y02P 90/20* (2015.11); *Y02P 90/22* (2015.11)

(58) Field of Classification Search
CPC ........... G05B 23/0229; G05B 23/0297; G06T 7/001; G06T 2207/10024; G06T 2207/10061; G06T 2207/30148; G01N 2201/068; G01N 21/9501; G01N 21/956; G03F 7/70525; G03F 7/7065; H01L 22/12; H01L 22/20; Y02P 90/22
See application file for complete search history.

(56) References Cited

U.S. PATENT DOCUMENTS

| | | | | |
|---|---|---|---|---|
| 6,850,320 | B2* | 2/2005 | Shibata | G01N 21/956 |
| | | | | 356/237.3 |
| 7,109,483 | B2* | 9/2006 | Nakasuji | G01N 23/225 |
| | | | | 250/307 |
| 7,482,178 | B2 | 1/2009 | Mui et al. | |
| 7,774,153 | B1 | 8/2010 | Smith | |
| 7,853,920 | B2 | 12/2010 | Preil et al. | |
| 7,877,722 | B2* | 1/2011 | Duffy | G03F 7/7065 |
| | | | | 716/55 |
| 8,126,255 | B2* | 2/2012 | Bhaskar | G06T 7/001 |
| | | | | 382/141 |
| 8,289,508 | B2 | 10/2012 | Lim et al. | |
| 8,356,207 | B2 | 1/2013 | Hosek et al. | |
| 8,515,568 | B1 | 8/2013 | Achtnig et al. | |
| 8,534,936 | B2* | 9/2013 | Matsuoka | G03F 7/708 |
| | | | | 118/52 |
| 8,689,055 | B2 | 4/2014 | Church et al. | |
| 8,781,781 | B2* | 7/2014 | Kulkarni | G05B 23/0297 |
| | | | | 702/108 |
| 9,310,316 | B2* | 4/2016 | Wu | G01N 21/9501 |
| 9,311,697 | B2* | 4/2016 | Harada | H01L 22/12 |
| 9,714,905 | B1* | 7/2017 | Plihal | G05B 19/4187 |
| 10,234,401 | B2* | 3/2019 | Buhl | G05B 19/4188 |
| 10,360,671 | B2* | 7/2019 | Rao | G06T 7/001 |
| 2002/0027653 | A1* | 3/2002 | Shibata | G01N 21/9501 |
| | | | | 356/237.3 |
| 2002/0081756 | A1 | 6/2002 | Asahina et al. | |
| 2002/0183949 | A1 | 12/2002 | Chen et al. | |
| 2003/0053676 | A1* | 3/2003 | Shimoda | G01N 21/95684 |
| | | | | 382/145 |
| 2005/0032250 | A1* | 2/2005 | Mui | H01L 22/20 |
| | | | | 438/14 |
| 2005/0159835 | A1* | 7/2005 | Yamada | G06Q 10/06 |
| | | | | 700/109 |
| 2006/0265145 | A1 | 11/2006 | Huet et al. | |
| 2006/0281199 | A1 | 12/2006 | Matsushita | |
| 2008/0230384 | A1 | 9/2008 | Pierce et al. | |
| 2008/0250384 | A1* | 10/2008 | Duffy | G03F 7/7065 |
| | | | | 716/55 |
| 2009/0080759 | A1* | 3/2009 | Bhaskar | G06T 7/001 |
| | | | | 382/141 |
| 2011/0224932 | A1* | 9/2011 | Huet | G01R 31/2656 |
| | | | | 702/81 |
| 2012/0029858 | A1* | 2/2012 | Kulkarni | G05B 23/0297 |
| | | | | 702/108 |
| 2013/0190095 | A1 | 7/2013 | Gadher et al. | |
| 2014/0067324 | A1 | 3/2014 | Ho et al. | |
| 2014/0072203 | A1* | 3/2014 | Wu | G01N 21/9501 |
| | | | | 382/149 |
| 2015/0221076 | A1* | 8/2015 | Gao | G06T 7/001 |
| | | | | 382/149 |

FOREIGN PATENT DOCUMENTS

| | | |
|---|---|---|
| JP | 2001-347440 | 12/2001 |
| JP | 2003-142362 | 5/2003 |
| JP | 2005-116769 | 4/2005 |
| JP | 2012-83351 | 4/2012 |
| TW | 201024752 | 7/2010 |

OTHER PUBLICATIONS

International Search Report for PCT/US2015/035406 dated Sep. 30, 2015.

Cheng et al., "Benefit Model of Virtual Metrology and Integrating AVM Into MES," IEEE Transactions on Semiconductor Manufacturing, vol. 24, Issue 2, Jan. 6, 2011, pp. 261-272.

* cited by examiner

AUTOMATIC RECIPE STABILITY MONITORING AND REPORTING

BACKGROUND OF THE INVENTION

1. Field of the Invention

The present invention generally relates to systems and methods for automatic recipe stability monitoring and reporting.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Inspection processes are usually performed on inspection tools by executing a set of instructions, normally called a "recipe," that include information about how an inspection process is to be performed. That information may include parameters for data collection performed during the inspection process such as optical parameters used to direct light to the wafer and to collect and detect light from the wafer. The information may also include parameters for data processing performed during or after the inspection process such as image processing and defect detection parameters to be applied to output generated by detector(s) of the inspection system.

Inspection recipe setup can be a relatively involved process since an appropriate recipe typically varies from wafer-to-wafer and inspection tool-to-inspection tool. For example, one inspection recipe that is suitable for inspection of a wafer on one tool may not be suitable for inspection of the same wafer on another tool. In addition, one inspection recipe that is suitable for inspection of a wafer on one tool may not be suitable for inspection of different wafers on the same tool. Therefore, inspection recipe setup is wafer-specific as well as tool-specific.

Once an inspection recipe has been set up, there are certain circumstances that can cause that inspection recipe to be no longer suitable for inspection of the type of wafers and tool that it was setup for. For instance, a change in one or more fabrication processes performed on the wafers, which an inspection recipe was setup for, may cause that inspection recipe to detect an abnormal number of defects on the wafers, which may not even be defects if the change in the one or more fabrication processes do not cause the wafers to be defective. In other words, not all variations in fabrication processes cause defects on wafers even though the resulting variations on the wafers can be detected as defects by an inspection recipe. In addition, if there are certain changes in the inspection tool itself (e.g., due to drift in one or more properties of one or more optical elements of the inspection tool), the changes in the inspection tool can cause an inspection recipe to be no longer suitable for inspection of the wafers the recipe was setup for.

Inspection results can therefore be influenced by a number of factors that are unrelated to the defects on the wafer. In order for the inspection results to reflect what is actually happening on the wafer, therefore, it is important to determine if an inspection recipe has become unsuitable for the wafers and tool it was setup for. Until it can be determined that the inspection results reflect defects on the wafer rather than drifts in the process used to fabricate the wafer or the inspection tool itself, those inspection results are not only useless but acting on those inspection results (e.g., changing the fabrication process) can actually cause real defects on wafers (e.g., if a perfectly fine fabrication process is altered to reduce "defects" detected on a wafer that are not defects at all but are detected as such due to drifts in the inspection tool).

Separating out influences on the inspection results can be a particularly difficult challenge. For instance, an abnormal number of defects detected on a wafer may be an abnormal number of actual defects on the wafer caused by a fabrication process failure. However, the abnormal number of defects may be caused by acceptable drifts in the fabrication process and/or unacceptable changes in the inspection tool. Therefore, first an abnormal inspection result must be detected and then its cause must be identified.

Currently, however, there is no known utility to periodically monitor the stability of inspection recipes for specific layers of semiconductor wafers that are inspected on multiple optical inspection tools used in a production line. Without the ability to monitor inspection results such as image patches and statistics collected from them for a given semiconductor wafer layer, it is very difficult to manually identify when a certain recipe becomes invalid for the inspection of the respective layer, due to variations in a semiconductor process.

Accordingly, it would be advantageous to develop systems and methods for monitoring stability of a wafer inspection recipe over time that do not have one or more of the disadvantages described above.

SUMMARY OF THE INVENTION

The following description of various embodiments is not to be construed in any way as limiting the subject matter of the appended claims.

One embodiment relates to a computer-implemented method for monitoring stability of a wafer inspection recipe over time. The method includes collecting inspection results over time. The inspection results are generated by at least one wafer inspection tool while performing the wafer inspection recipe on wafers at different points in time. The method also includes identifying abnormal variation in the inspection results by comparing the inspection results generated at different times to each other. In addition, the method includes determining if the abnormal variation is attributable to the wafers, the wafer inspection recipe, or one or more of the at least one wafer inspection tool thereby determining if the wafer inspection recipe is stable over time. The collecting, identifying, and determining steps are performed by a computer system.

Each of the steps of the method may be further performed as described herein. In addition, the method may include any other step(s) of any other method(s) described herein. Furthermore, the method may be performed by any of the systems described herein.

Another embodiment relates to a non-transitory computer-readable medium storing program instructions executable on a computer system for performing a computer-implemented method for monitoring stability of a wafer inspection recipe over time. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to monitor stability of a wafer inspection recipe over time. The system includes at least one wafer inspection tool configured to generate inspection results by performing a wafer inspection recipe on wafers at different points in time. The system also includes a computer subsystem configured for performing the collecting, identifying, and determining steps of the method described above. The system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The embodiments described herein generally relate to automatic recipe stability monitoring and reporting. One embodiment relates to a computer-implemented method for monitoring stability of a wafer inspection recipe over time. The embodiments described herein provide an approach to automatically compute and monitor important metrics related to stability of inspection recipes on production inspection tools, based on information collected from wafer locations, which may be pre-defined, to identify potential variations in the respective semiconductor wafer fabrication processes. The embodiments described herein also provide an approach to perform automatic data collection from multiple inspection tools (e.g., via periodic polling), analyze data trends, and generate reports and alerts for events that deviate from normal behavior.

In one embodiment, the one or more fabrication processes described herein are part of a production process. A "production process" can be generally defined in the art of semiconductor device manufacturing as a production or fabrication process that produces devices in high volumes. Therefore, a production process is a process that is performed after the research and development stage in which a process for fabricating semiconductor devices is created and after the ramp stage that is performed to transition a process created in research and development into a high volume manufacturing environment.

A production process can therefore be considered a process that has been debugged by research and development and ramp and whose issues and limitations are relatively well understood. As such, inspection processes performed in a production environment can be substantially different from inspection processes performed at other stages of manufacturing. For instance, by the time high volume manufacturing has been started, the typical defects caused by that particular manufacturing process have been identified in the earlier stages of manufacturing. Therefore, inspection processes performed during production are generally performed to monitor variations from typical behavior of the production, rather than to perform defect discovery as in earlier stages.

Recipe stability can be a key issue for users of production inspection tools. For example, a change in the process, or process variation, or variation in the defect population can result in an unstable recipe. Stability of inspection recipes is a critical component that directly affects the yield of semiconductor wafer production at fabs. In a typical production setting, it is important to ascertain that the performance of inspection recipes matches the performance results shown during the recipe setup phase for a given semiconductor layer. Minor changes in wafer process conditions could change the statistics of the final image generated by optical inspection tools thereby directly affecting the capture and nuisance rate of the inspection recipe. Such minor fluctuations in wafer conditions could affect the ability of optical inspection tools to detect key defect of interest (DOI) types thereby affecting the sensitivity of the inspection tools.

A "nuisance" as that term is used herein may be defined as a defect that is detected on a wafer by wafer inspection, but that is not actually a defect. Nuisances are therefore not related to semiconductor yield and are not interesting to semiconductor manufacturers. For instance, a "nuisance" may be a source of noise in wafer inspection system output that is erroneously detected as a defect. Therefore, separating detected defects that are actually detects from detected defects that are not actual defects can be an important part of wafer inspection.

Figure 1:
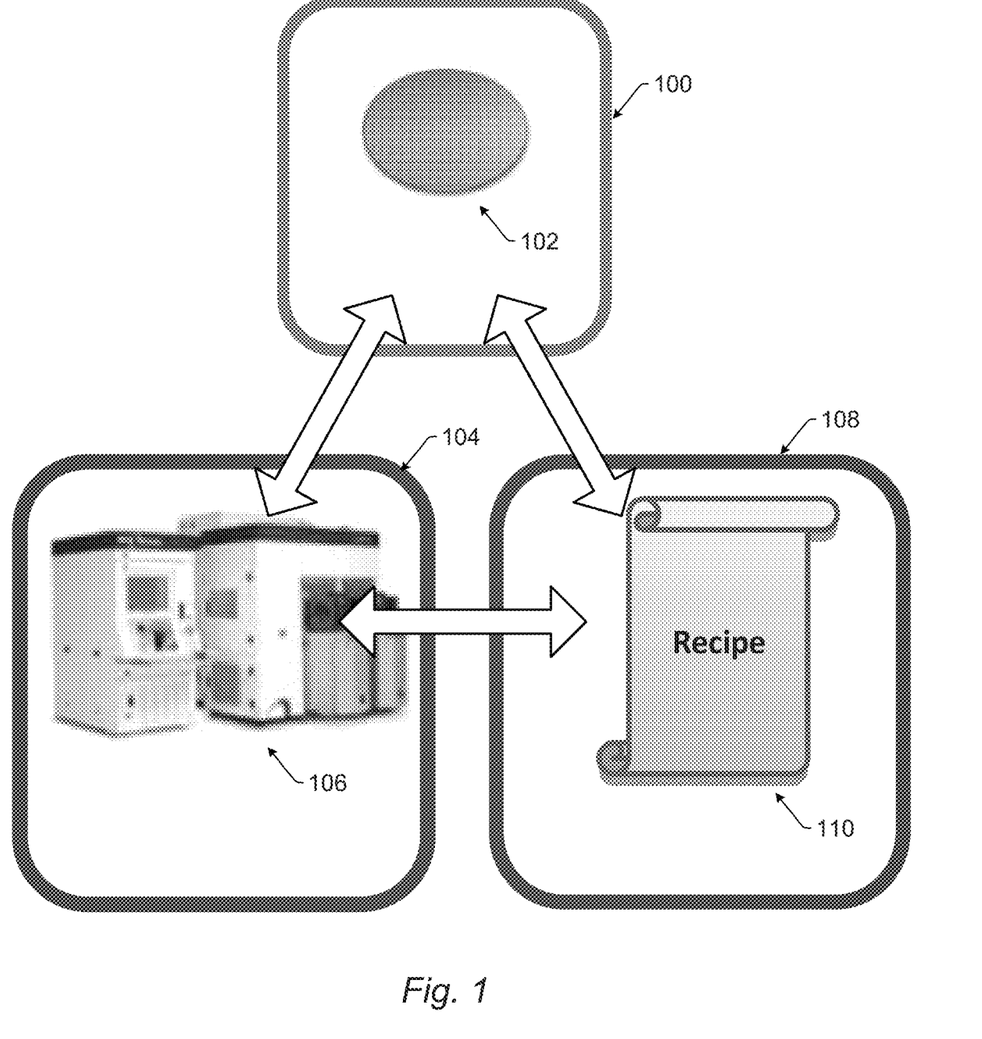
FIG. 1 is a block diagram illustrating the three major sources of variability that affect stability of wafer inspection recipes.

FIG. 1 shows the three major sources of variation that affect the stability of inspection recipes. For example, as shown in this figure, source 100 of variation may be due to changes on wafers 102 themselves, which may be caused by changes in the process(es) used to fabricate the wafers (even if the recipes used for those fabrication process(es) are the same, meaning that the changes in the process(es) are due to unintended changes in the process(es) such as tool failure, drift in process conditions, etc.). Source 104 of variation may be due to changes in inspection tool(s) 106 that are used to inspect the wafers, which may be due to drift in one or more parameters of the inspection tool(s), tool failure, etc. Source 108 of variation may be due to recipe 110 used to inspect the wafers on the wafer inspection tool, which may be due to, for example, recipe overfitting. This figure therefore shows the inter-dependency of the three components involved in an inspection (wafer, inspection tool, inspection recipe) that affect the stability of inspection recipes. The three sources mentioned in the figure need to be in sync at all times to maintain the stability and sensitivity of inspection tools. While changes in wafer process conditions happen throughout the production cycle, it is important to identify when a particular process change directly affects the sync between the wafer condition and the sensitivity of the inspection tools.

The inspection results described herein are generated by at least one wafer inspection tool while performing the wafer inspection recipe on wafers at different points in time. For example, as part of the setup procedure for inspection recipes, a set of locations may be selected on the wafer (from different physical regions and different process regions) for which data (image patches and/or job dumps) will be collected. At the end of an inspection scan, the data (for the predefined locations) is collected (using the same recipe as the inspection run) and saved into a location in the respective lot-result. These steps may be performed as they are normally performed in any inspection recipe. In addition, the embodiments described herein are not limited to any particular inspection results, and the inspection results collected as described herein may be generated in any known manner.

In one embodiment, the at least one wafer inspection tool is at least one optical inspection tool. In other words, the at least one wafer inspection tool may be a light-based inspection tool. Although the embodiments described herein may be particularly suitable for optical inspection tools used in a production environment and will be described herein as such, the embodiments described herein are also suitable for use with other inspection tools used in a production environment, which may include, for example, electron beam (or e-beam) inspection tools. The at least one optical inspection tool may be further configured as described herein.

The method includes collecting inspection results over time. For example, in the collecting step, key information from production inspection tools may be collected, possibly for only pre-defined locations on the wafer. Varying amounts of data in the inspection results may be collected in the embodiments described herein. For example, a relatively small amount of data collection may include collection of only image patches generated by inspection while a larger amount of data collection may include collection of image patches, scatter plots, and light level histograms generated during inspection. In addition, an even larger amount of data collection may include collection of job dumps as well as light level histograms. In any case, the amount of data collection that is used in any one version of the method may be determined based on the information that is most related to the stability of an inspection recipe, which can vary from inspection recipe to inspection recipe.

Collecting the inspection results may include acquiring the inspection results using one or more inspection tools. For example, collecting the inspection results may include scanning light over the wafer and generating output responsive to light from the wafer detected by an inspection tool during the scanning. In this manner, collecting the inspection results may include scanning the wafer by performing an inspection process on the wafer using an inspection recipe. However, collecting the inspection results does not necessarily include scanning the wafer. For example, collecting the inspection results may include acquiring the inspection results from a storage medium in which the inspection results have been stored (e.g., by an inspection tool). Collecting the inspection results from the storage medium may be performed in any suitable manner, and the storage medium from which the inspection results are acquired may include any of the storage media described herein.

In one embodiment, collecting the inspection results is performed periodically as a function of time. For example, a data collection component such as that described further herein may run on a centralized server such as an XP-Rack, which is commercially available from KLA-Tencor, Milpitas, Calif., and may poll the inspection tool(s) periodically to collect data or information on inspection scans (stored in the inspection tool(s) by the inspection tool(s)). Regardless of whether or not the inspection results are collected periodically, the inspection results that are collected may include inspection results generated from each inspection run (i.e., every inspection run) from at least one wafer inspection tool. In other instances, however, the inspection results that are collected may be for fewer than all inspection runs performed with a particular inspection recipe.

In another embodiment, collecting the inspection results includes storing the inspection results generated by two or more of the at least one wafer inspection tool in the same computer-readable storage medium. For example, once the data collection component identifies new data in an inspection tool, it may copy the respective information. (e.g., job dumps, simulated runtime imaging (SRI), light-level histograms (or light-level runtime histograms (LL-RTH), image patches, recipe, classifiers, etc.) to a centralized data source.

Figure 2:
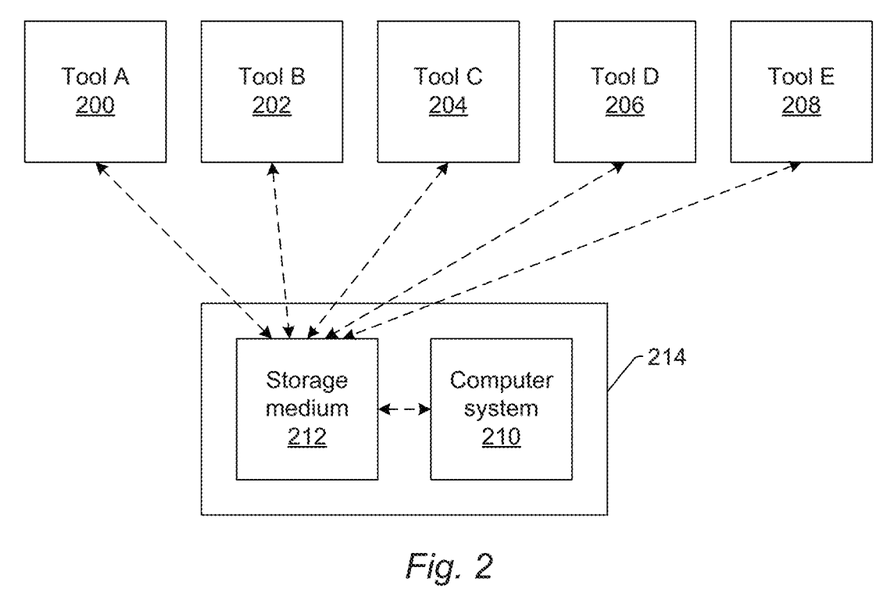
FIG. 2 is a block diagram illustrating one embodiment of a system configured to monitor stability of a wafer inspection recipe over time.

FIG. 2 illustrates one such embodiment of a system configured to perform the steps of the method(s) described herein. For example, as shown in FIG. 2, system 214 may include computer system 210 and storage medium 212. Computer system 210 may be configured according to any of the embodiments described herein with respect to a computer system or subsystem. Storage medium 212 may be configured according to any of the embodiments described herein with respect to a non-transitory computer-readable storage medium. Computer system 210 and storage medium 212 may in this embodiment be configured as two parts of one computer system. However, computer system 210 and storage medium 212 may be two parts of two different systems that are physically separated from each other, but able to communicate with each other (e.g., send collected information and/or instructions to and from each other) by one or more transmission media, shown by the dashed line between the computer system and the storage medium in FIG. 2, which may include any suitable transmission media known in the art and may include "wireless" and/or "wired" transmission media.

As further shown in FIG. 2, storage medium 212 may be coupled to two or more inspection tools (e.g., Tool A 200, Tool B 202, Tool C 204, Tool D 206, and Tool E 208 shown in FIG. 2) such that the storage medium can collect inspection results from each of the tools. For instance, storage medium 212 may be coupled to the two or more inspection tools by one or more transmission media shown by the dashed lines in FIG. 2 between the storage medium and the tools, which may be configured as described further herein, such that the storage medium can request inspection results from the inspection tools and receive the requested inspection results from the inspection tools. In this manner, the system shown in FIG. 2 may be configured as a dedicated computer system that can connect to all of the inspection tools that need to be monitored.

In an additional embodiment, collecting the inspection results includes storing the inspection results with information for identities of the wafers, the wafer inspection recipe, the at least one wafer inspection tool, and time that the wafer inspection recipe was performed corresponding to the inspection results. For example, the data collection component may copy the collected information to a centralized data source and that information may be grouped in the data source by layer ID, device ID, tool ID, date/time stamp, etc. In this manner, metrics from every wafer (or at least some wafers) may be collected by the system and copied into the storage medium, which can maintain an organized record of all the metrics based on layer ID, device ID, tool ID, recipe, time stamp, etc. over a period of time that can be retrieved at any later point.

The method also includes identifying abnormal variation in the inspection results by comparing the inspection results generated at different times to each other. Therefore, the collecting and identifying steps described herein can be used to automatically compute and monitor important metrics related to stability of inspection recipes on production inspection tools. The set of utilities described further herein that can be used for performing the operations of these steps may be called a "recipe stability monitor" or RSM. In some instances, comparing the inspection results may include computing metrics such as those described further herein, analyzing trends in the collected inspection results (including, but not limited to, the various inspection results described herein), comparing inspection results (e.g., comparing images), and displaying statistics for different inspections (i.e., at least a pair of inspections). The collected inspection results may also be used to build a statistical model for every wafer layer and inspection tool combination. That statistical model can then be used to identify abnormal variation from the normal behavior.

Analyzing the trends in the metrics can also be performed by generating a trend chart and then monitoring the trend chart. Analyzing the trends of the estimated stability parameters may be performed using an infrastructure such as that shown in FIG. 2. In addition, identifying the abnormal variations may include learning key aspects of inspection runs, which may then be used as the inspection results that are compared as described herein, for every layer that is monitored/inspected based on metrics such as those described herein, which may be estimated at pre-defined wafer locations. In this manner, the embodiments described herein can "learn" the data characteristics over a period of time. An "abnormal variation" may also be generally defined as a deviation in the inspection results, which may be tracked using a trend chart, that exceeds a predetermined acceptable tolerance for one of the metrics (for a certain wafer layer and inspection tool). In some instances, the embodiments described herein may be configured to alert a user to an identified abnormal variation and to request verification of the abnormal variation as valid. In this manner, a user may manually confirm an abnormal variation alert (as not a false alarm).

In one embodiment, the inspection results that are compared include one or more characteristics of one or more images generated by the at least one wafer inspection tool for the wafers. For example, the one or more characteristics of the image(s) that are compared may include image metrics such as, but are not limited to, mean color level, gray level scatter, modality of a gray level histogram, and flatness of a gray level histogram. In addition, wafer-to-wafer image analysis may include patches and line profiles (i.e., a plot of the intensity of an image at a chosen row of pixels in the image), histograms, and scatter plots.

The inspection results may also include other light-based measurements, which may or may not include generating any images, performed during an inspection recipe and/or characteristics determined therefrom. For example, the inspection results may include light level metrics such as light RTH, mean light level, modality, and peakedness. The inspection results may also include focus measurements such as sharpness and contour focus. Such light level metrics and/or focus measurements may be determined by the inspection tool as part of the inspection recipe and/or may be determined by the embodiments described herein as part of the monitoring procedure. Light level analysis performed for the comparing step may include light level histograms, end points (the lower and upper limits of the histogram that contain the major population of the pixel intensities within the chosen light box, which is specified in recipe setup), gain, illumination, and offsets.

In another embodiment, the inspection results that are compared are produced prior to performing defect detection for the wafers in the wafer inspection recipe. In other words, the inspection results that are compared may include output that is not necessarily generated by defect detection performed during the wafer inspection recipe. For example, as described further herein, the inspection results that are compared may include images, image metrics, light-based measurements, light-based metrics, focus measurements, etc. that are not necessarily produced by a defect detection algorithm and/or method during the wafer inspection recipe. Therefore, although the embodiments described herein may include comparing some characteristics of the defects that are detected and/or classified on a wafer, the embodiments described herein are not limited to just comparing information for the detected and/or classified defects.

In an additional embodiment, the inspection results that are compared include one or more characteristics of defects detected on the wafers by the wafer inspection recipe. For example, the inspection results that are compared may include results of application of a defect detection algorithm and/or method to the output of one or more detectors of the inspection tool. The inspection results that are compared in the embodiments described herein may also include other results of applying the defect detection algorithm and/or method such as information about noise identified on the wafer by the defect detection algorithm and/or method. For example, the results that are compared may include wafer noise such as the noise identified in optical difference images that does not correspond to any noticeable defect on the wafer at a specified location (e.g., an x/y location). In addition, the comparing step may include analysis of the recipe itself such as test/sensitivity setting differences.

In a further embodiment, the inspection results that are compared include one or more characteristics of defect classification results produced by the wafer inspection recipe. For example, the inspection recipe may involve applying some defect classifier (e.g., the iDO classifier that is commercially available from KLA-Tencor), method, or algorithm to the defect detection results produced by the inspection. In one such example, the inspection results that are used and/or compared herein for monitoring may include a stability estimate of the defect classification. In addition, the comparing step may include identifying classifier differences.

In one embodiment in which the inspection results that are being compared include characteristic(s) of defect classification results, the variation of the defect attributes from a given inspection with respect to an earlier inspection or from a particular point on a trend chart may be measured. This variation may be calculated only for the defect attributes used in the defect classification of the inspection recipe being considered. The variation value may then be matched with the equivalent cutlines of the defect classification to determine if the deviation causes a significant variation in the end results of the defect classification, which can directly affect the nuisance rate of an inspection process.

In another embodiment, comparing the inspection results to each other includes determining one or more characteristics of the inspection results that are not generated by the wafer inspection recipe and comparing the one or more characteristics of the inspection results generated at different times to each other. For example, a computer system or subsystem described herein (or an "analytics component" of RSM) may compute metrics for estimating stability of various aspects of an inspection using the stored data for each layer, inspection tool, and wafer locations. In one such example, computer system 210 shown in FIG. 2 may be configured for analytics, report generation, as well as any other step(s) described herein. The metrics that are computed may include metrics of any of the inspection results described herein and/or any other inspection results that are produced by an inspection recipe. For example, the embodiments described herein may monitor stability of optical inspection tools using a set of metrics extracted from the optical images. The metrics may also be computed for as many inspection results as are collected (e.g., each inspection performed with a particular inspection recipe) or fewer than all of the inspection results that are collected.

Analyzing the trends may also include loading the collected data for a certain period, analyzing data trends for various inspection results or metrics thereof described herein, and then possibly analyzing information from a pair of dates or tools in detail (e.g., viewing image patches, histograms, scatter plots, etc.). For example, the embodiments described herein may be configured to display a user interface to a user that includes information about the recipes (and/or layers) that are being monitored by the embodiments. The user interface may also include information about the inspection tools that are being monitored. A user may then select to view the trend charts for a specific recipe/tool combination by selecting one or more of each in the user interface.

Upon such selections, the user interface may be configured to display selections for which parameters of the inspection results are being monitored (e.g., wafer-to-wafer test images, wafer-to-wafer difference images, focus, light level, classification, recipe, etc.). Upon selection of one of the parameters, the user interface may be configured to display one or more trend charts to the user. The trend chart(s) may include, for example, plots that show values for one or more metrics as a function of time and the selected parameters. For example, if the wafer-to-wafer test image parameter is selected, then the plot may show values for color, gray level noise, histogram flatness, and histogram shape as a function of day and time that the inspections that produced the inspection results were performed. The plot may show different metrics for other inspection results parameters. In addition, the user interface may show the locations that are being monitored for whichever recipe and tool(s) have been selected. The user interface may provide capability for the user to select one or more of the monitored locations such that the trend charts that are shown in the user interface are only for certain, selected monitored locations. The user interface may also show the inspection time stamps for each inspection whose results were collected and are being monitored based on the recipe and tool(s) selected in the user interface by the user. The user interface may be further configured such that the user can select one or more individual inspections from the listed inspection time stamps.

The inspection results and/or metrics that are being shown in the trend chart can then be shown in the user interface in greater detail. For example, if the color, grey level noise, histogram flatness, and histogram shape are being shown in a trend chart, when a user selects two or more individual inspections, the user interface may then display image patches included in the inspection results for the selected individual inspections as well as line profiles and histograms from the image patches. Those line profiles and histograms can show color variation in the inspection results and can, therefore, be used to automatically or manually identify color variations from two different inspection runs.

The embodiments described herein may also be configured to generate or issue reports and/or notifications/alerts, possibly in real time, to notify fab engineers or other users of possible deviations or events that deviate from normal or default behavior based on the learning performed by the collecting and identifying steps (i.e., events that show deviations from normal (where the "normal" used in the embodiments described herein is a configurable deviation tolerance determined based on which "alerts" are to be reported to users or fab engineers)). In addition, the identifying step may include real-time updating of reports and trend charts based on the data collected from the inspection tool(s). In this manner, the embodiments described herein can learn the data characteristics over a period of time and generate trend charts for one or more parameters of the inspection results and reports for layers that were analyzed. Automatic alert generation and live updates help in quickly flagging outlier data points and enables identification of stability issues at or near real time. For example, the embodiments described herein can be used to analyze every new data point (inspection results) as it is collected and generate automatic alerts when the data point shows any deviation from normal behavior.

In one example of a sample report, a table may be generated that includes a number of columns related to the inspection that produced the inspection results (e.g., recipe name, tool name, date/time stamp, etc.) as well as a number of columns related to the metrics being monitored (e.g., light level, mean gray level, noise width, etc.). In this manner, a single report may include monitoring results for more than one wafer inspection recipe and more than one tool.

The method further includes determining if the abnormal variation is attributable to the wafers, the wafer inspection recipe, or one or more of the at least one wafer inspection tool thereby determining if the wafer inspection recipe is stable over time. In this manner, the abnormal variation identified as described above may be used to identify instability conditions in the wafer/recipe/tool combination being monitored. In this manner, a set of metrics (e.g., metrics extracted from optical images) collected from every inspected wafer (or at least some inspected wafers) may be used to detect situations where a given tool, inspection recipe, and wafer goes out of "sync" (i.e., where the inspection recipe becomes no longer suitable for a particular wafer and inspection tool), which is critical to maintaining good yield ratios using the results of inspection.

In some embodiments, the determining step includes comparing the inspection results for at least two of the wafers generated by the same one of the at least one wafer inspection tool. For example, decoupling sources of variation may include cross-correlating metrics for an abnormal variation identified as described herein on a given inspected wafer with other wafers at different layers than the first wafer and inspected by the same inspection tool thereby identifying the probable source of variation. In particular, two different wafers that have been processed using different fabrication processes (and are therefore wafers of different layers) may be inspected on the same inspection tool (and possibly at roughly the same time (e.g., on the same day)) with different recipes. If the inspection results for both of those wafers show abnormal variations, then the abnormal variations can be attributed to the wafer inspection tool. However, if the inspection results for only one of those wafers shows abnormal variations, then the abnormal variations can be attributed to the wafer itself (i.e., the fabrication process(es) used to form the wafer). In this manner, the embodiments described herein can correlate the abnormal variation with other recipes that ran on a given inspection tool to decouple the sources of variation.

In another embodiment, the determining step includes comparing the inspection results for at least two of the wafers generated by different ones of the at least one wafer inspection tool. For example, decoupling sources of variation may include cross-correlating metrics for an abnormal variation identified as described herein on a given inspected wafer with other wafers at the same layer as the first wafer and inspected by the different inspection tools thereby identifying the probable source of variation. In particular, two different wafers that have been processed using the same fabrication process(es) (and are therefore wafers of the same layer) may be inspected on different inspection tools with the same inspection recipe. If the inspection results for both of those wafers show abnormal variations, then the abnormal variations can be attributed to the wafer themselves (i.e., the fabrication process(es) used to form the wafers). However, if the inspection results for only one of those wafers shows abnormal variations, then the abnormal variations can be attributed to the wafer inspection tool used to inspect the wafer whose inspection results were found to have abnormal variations. In some instances in which the same type of wafers are being inspected on different inspection tools, the embodiments described herein provide a clear record of the statistics from inspected wafers over a period of time, which can be used as an important key for identifying patterns of stability/variation and for tool matching use cases. In this manner, the embodiments described herein can correlate the abnormal variation with other tools that ran the same recipe on or near a given date to decouple the sources of variation.

The abnormal variations identified by the embodiments described herein can therefore be attributed to a number of different causes including focus offset drifts in the inspection tool, color variations (caused by variations in the wafer and/or the inspection tool), noise width changes (caused by variations in the wafer and/or the inspection tool), defect population fluctuations (due to variations in the wafer, inspection tool, and/or inspection recipe), run time light level variations (due to variations in the wafer and/or inspection tool), and recipe changes.

In addition, different abnormal variations can be identified by different metrics described herein. For example, image focus metrics can be used to diagnose focus drifts in the inspection tool, which may be due to variations in the wafer or the inspection tool, exceeding some predetermined focus variation tolerance. In another example, color variation metrics can be used to identify color variation and intensity variance across different sites on a wafer, which may be due to variations in the wafer and/or the inspection tool, to thereby diagnose process variation, tool-to-tool matching issues, and defect classification stability. In an additional example, noise variation metrics, which may be determined by computing and/or displaying scatter plots determined by a defect detection algorithm for different sites on a wafer, which may be due to variations in the wafer and/or the inspection tool, may be used to diagnose tool stability and process variation. In a further example, image pattern variation metrics may be used to identify image level pattern variations from selected defect sites, which may be due to variations in the wafer, to thereby diagnose process variation. In yet another example, defect count per inspection, swath area, inspected area, throughput, etc. may be used to capture defect count variations before and after defect classification, which may be due to variations in the wafer, inspection recipe, and inspection tool, to thereby diagnose recipe instability and/or process variation. In an additional example, run time light level metrics may be used to identify changes in light level mean and shape of light level histograms, which may be due to variations in the inspection tool, wafer, and/or inspection recipe, to thereby diagnose recipe instability. In another example, success rate or percentage success of aligning design information to inspection tool output, which may include displaying design clips and respective aligned images or other output from a scan, may be used to diagnose issues related to alignment to design, which may be due to issues in the inspection recipe. In addition, defect classification stability metrics may be used to diagnose instability in one or more parameters of defect classification such as attributes used for classification and cutlines used to separate different defect classifications from each other, which may be due to issues in the inspection recipe.

Once an abnormal variation has been attributed to a particular cause (e.g., wafer, inspection tool, or inspection recipe), the embodiments described herein may include performing further analysis to identify why the abnormal variation happened. For example, if an abnormal variation in a focus metric is detected, further analysis may be performed by the embodiments described herein to find out why this happened. The further analysis may include, for example, viewing and/or examining light level histograms, checking recipe modifications (e.g., optical mode, focus optimization routines, etc.) if any, and checking trends of inspections that were run on the same tool on the same date.

In one embodiment, the collecting, identifying, and determining steps are performed automatically. For example, all of the steps described herein may be performed automatically by one or more of the system embodiments described herein. Performing the steps automatically is advantageous for collecting and analyzing the substantial amount of inspection results described herein, which cannot be realistically managed manually, and for discovering a wafer inspection recipe instability faster than it could be discovered manually.

The collecting, identifying, and determining steps described herein are performed by a computer system, which may be configured according to any of the embodiments described herein. In one embodiment, the computer system is not part of any of the at least one wafer inspection tool. For example, as shown in FIG. 2, the computer system that performs the steps of the method may be physically separate from all of the wafer inspection tools from which inspection results are collected. In this manner, the computer system may be a stand-alone type computer system that is not part of any inspection tool although the computer system may be coupled to each of the inspection tools as described further herein.

Each of the embodiments of the methods described above may include any other step(s) of any other method(s) described herein. Furthermore, each of the embodiments of the methods described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 3:
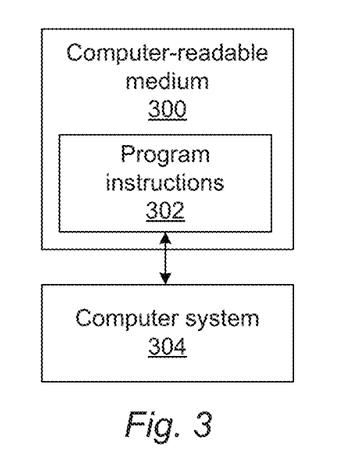
FIG. 3 is a block diagram illustrating one embodiment of a non-transitory computer-readable medium storing program instructions for causing a computer system to perform a computer-implemented method described herein.

Another embodiment relates to a non-transitory computer-readable medium storing program instructions executable on a computer system for performing a computer-implemented method for monitoring stability of a wafer inspection recipe over time. One such embodiment is shown in FIG. 3. For example, as shown in FIG. 3, non-transitory computer-readable medium 300 stores program instructions 302 executable on computer system 304 for performing a computer-implemented method for monitoring stability of a wafer inspection recipe over time. The computer-implemented method may include any step(s) of any method(s) described herein.

Program instructions 302 implementing methods such as those described herein may be stored on non-transitory computer-readable medium 300. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 304 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 4:
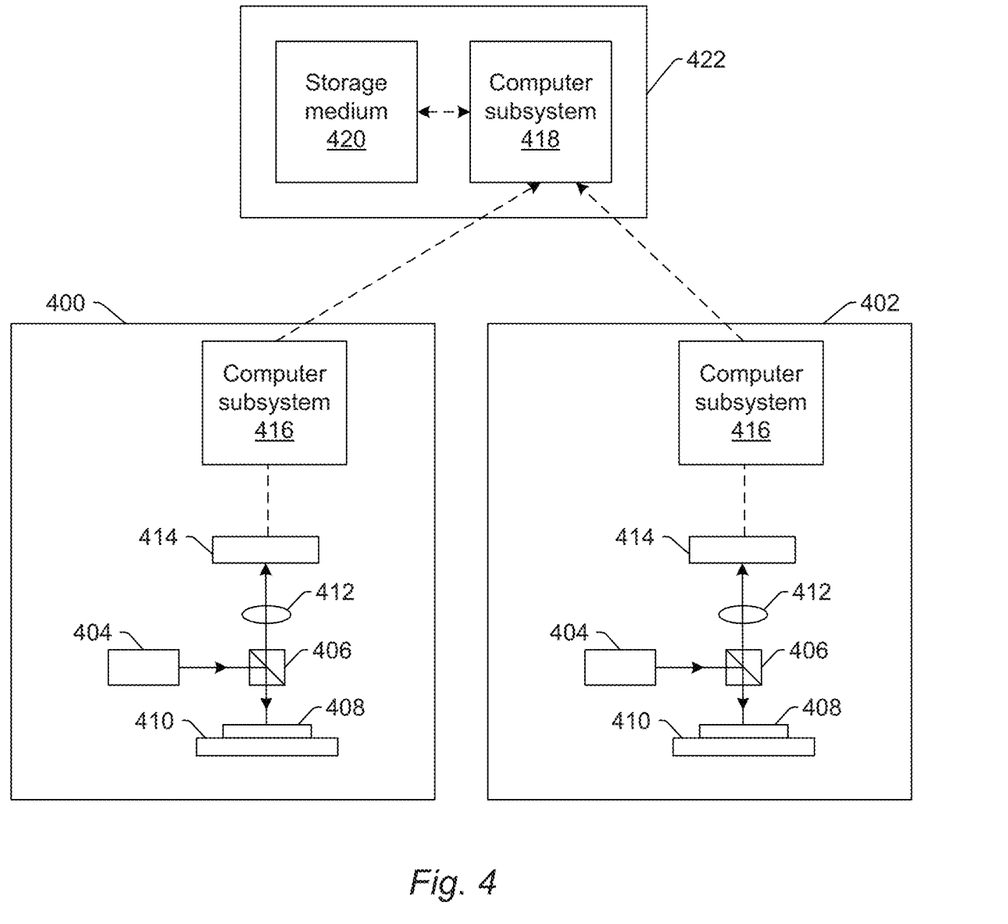
FIG. 4 is a schematic diagram illustrating a side view of an embodiment of a system configured to monitor stability of a wafer inspection recipe over time.

An additional embodiment relates to a system configured to monitor stability of a wafer inspection recipe aver time. The system includes at least one wafer inspection tool configured to generate inspection results by performing a wafer inspection recipe on wafers at different points in time. One embodiment of wafer inspection tools) is shown in FIG. 4 as wafer inspection tools 400 and 402. Although two wafer inspection tools are shown in FIG. 4, the system may include any other number of wafer inspection tools described herein. In addition, although the wafer inspection tools are shown in FIG. 4 as having the same configuration, the system embodiments described herein may include one or more wafer inspection tools that are different than other wafer inspection tools included in the system.

As shown in FIG. 4, inspection tools 400 and 402 include light source 404, which may include any suitable light source known in the art such as a broad band plasma (BBP) light source or a laser. Light from the light source may be directed to beam splitter 406, which may be configured to direct the light from the light source to wafer 408. The light source may be coupled to any other suitable elements (not shown) such as one or more condensing lenses, collimating lenses, relay lenses, objective lenses, apertures, spectral filters, polarizing components and the like. As shown in FIG. 4, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously.

The inspection tools may be configured to scan the light over the wafer in any suitable manner. For example, the inspection tools may include stage 410 on which wafer 408 is disposed during a wafer inspection recipe. The stage may be coupled to one or more mechanical and/or robotic assemblies (not shown) that are configured to move the stage in one or more directions such that the light can be scanned over the wafer. In addition, or alternatively, the wafer inspection tools may include one or more optical elements (not shown) that are configured to scan the light over the wafer.

Light from wafer 408 may be collected and detected by one or more detectors of the inspection tools during scanning. For example, light reflected from wafer 408 at angles relatively close to normal (i.e., specularly reflected light when the incidence is normal) may pass through beam splitter 406 to lens 412. Lens 412 may include a refractive optical element as shown in FIG. 4. In addition, lens 412 may include one or more refractive optical elements and/or one or more reflective optical elements. Light collected by lens 412 may be focused to detector 414. Detector 414 may include any suitable detector known in the art such as a charge coupled device (CCD) or another type of imaging detector. Detector 414 is configured to generate output that is responsive to the reflected light collected by lens 412. Therefore, lens 412 and detector 414 form one channel of the inspection tools. This channel of the inspection tools may include any other suitable optical components (not shown) known in the art. The output of the detector may include, for example, images, image data, signals, image signals, or any other output that can be generated by a detector suitable for use in an inspection tool.

Since the inspection tools shown in FIG. 4 are configured to detect light specularly reflected from the wafer, the inspection tools are configured as bright field (BF) inspection tools. Such inspection tools may, however, also be configured for other types of wafer inspection. For example, the inspection tools shown in FIG. 4 may also include one or more other channels (not shown). The other channel(s) may include any of the optical components described herein such as a lens and a detector, configured as a scattered light channel. The lens and the detector may be further configured as described herein. In this manner, the inspection tools may also be configured for dark field (DF) inspection.

The inspection tools also include computer subsystem 416 that is coupled to one or more elements of the tools. For example, the computer subsystems may be coupled to one or more detectors of the inspection tools such that the computer subsystems can receive output generated by the detector(s). In this manner, output generated by the detector(s) of the inspection tools may be provided to computer subsystems 416.

Computer subsystems 416 are configured for detecting defects on a wafer based on the output generated for the wafer by the detector, which may be performed in any suitable manner known in the art.

The system also includes computer subsystem 418 configured for performing the collecting, identifying, and determining steps described herein. For example, the computer subsystem may collect the inspection results from at least one of the wafer inspection tools and store the results in storage medium 420. Computer subsystem 418 and storage medium 420 may be further configured as described herein (e.g., as part of one system 422 or as separate entities that are coupled by one or more transmission media (not shown in FIG. 4)). The computer subsystem may be configured to perform any other steps described herein. The system may also be further configured as described herein.

It is noted that FIG. 4 is provided herein to generally illustrate a configuration of inspection tools that may be included in the system embodiments described herein. Obviously, the inspection tool configuration described herein may be altered to optimize the performance of the inspection tool as is normally performed when designing a commercial inspection tool. In addition, the systems described herein may be implemented using existing inspection tool(s) (e.g., by coupling elements described herein (e.g., computer subsystem 418 and/or storage medium 420) to existing inspection tool(s)) such as inspection tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Furthermore, although the system shown in FIG. 4 is described herein as including optical or light-based inspection tools, the inspection tool(s) may be configured as electron beam based inspection tool(s). The electron beam based inspection tool(s) may be any suitable electron beam based inspection tool(s) including commercially available electron beam inspection tool(s).

Further modifications and alternative embodiments of various aspects of the invention will be apparent to those skilled in the art in view of this description. For example, systems and methods for monitoring stability of a wafer inspection recipe over time are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for monitoring stability of a wafer inspection recipe over time, comprising:
collecting inspection results over time, wherein the inspection results are generated by at least one wafer inspection tool while performing the wafer inspection recipe on wafers at different points in time, wherein said collecting comprises storing the inspection results with information for identities of the wafers, the wafer inspection recipe, the at least one wafer inspection tool, and time that the wafer inspection recipe was performed corresponding to the inspection results, and wherein collecting the inspection results further comprises scanning light over the wafers and generating output responsive to light from the wafers detected by the at least one wafer inspection tool during the scanning;

identifying abnormal variation in the inspection results by comparing the inspection results generated at different times to each other, wherein the inspection results that are compared comprise one or more characteristics of one or more images generated by the at least one wafer inspection tool for the wafers, and wherein said comparing comprises analyzing trends in the inspection results by generating a trend chart that shows values for the inspection results as a function of time and monitoring the trend chart for the abnormal variation defined as a deviation in the inspection results in the trend chart that exceeds a predetermined acceptable tolerance for one of the one or more characteristics of the one or more images; and determining if the abnormal variation is attributable to the wafers, the wafer inspection recipe, or one or more of the at least one wafer inspection tool thereby determining if the wafer inspection recipe is stable over time, wherein said determining comprises comparing the inspection results for at least two of the wafers generated by the same one of the at least one wafer inspection tool, wherein the at least two of the wafers comprise wafers at different layers processed using different fabrication processes, and wherein said collecting, said identifying, and said determining are performed by a computer system.

2. The method of claim 1, wherein the inspection results that are compared in the identifying step are produced prior to performing defect detection for the wafers in the wafer inspection recipe.

3. The method of claim 1, wherein the inspection results that are compared in the identifying step further comprise one or more characteristics of defects detected on the wafers by the wafer inspection recipe.

4. The method of claim 1, wherein the inspection results that are compared in the identifying step further comprise one or more characteristics of defect classification results produced by the wafer inspection recipe.

5. The method of claim 1, wherein comparing the inspection results to each other in the identifying step further comprises determining one or more characteristics of the inspection results that are not generated by the wafer inspection recipe and comparing the one or more characteristics of the inspection results generated at the different times to each other.

6. The method of claim 1, wherein said collecting is performed periodically as a function of time.

7. The method of claim 1, wherein said collecting further comprises storing the inspection results generated by two or more of the at least one wafer inspection tool in the same computer-readable storage medium.

8. The method of claim 1, wherein said determining further comprises comparing the inspection results for at least two of the wafers generated by different ones of the at least one wafer inspection tool.

9. The method of claim 1, Wherein said collecting is performed during a production process in which one or more of the fabrication processes are performed on the wafers.

10. The method of claim 1, wherein the at least one wafer inspection tool is at least one optical inspection tool.

11. The method of claim 1, wherein said collecting, said identifying, and said determining are performed automatically.

12. The method of claim 1, wherein the computer system is not part of any of the at least one wafer inspection tool.

13. A non-transitory computer-readable medium, storing program instructions executable on a computer system for performing a computer-implemented method for monitoring stability of a wafer inspection recipe over time, wherein the computer-implemented method comprises:

collecting inspection results over time, wherein the inspection results are generated by at least one wafer inspection tool while performing the wafer inspection recipe on wafers at different points in time, wherein said collecting comprises storing the inspection results with information for identities of the wafers, the wafer inspection recipe, the at least one wafer inspection tool, and time that the wafer inspection recipe was performed corresponding to the inspection results, and wherein collecting the inspection results further comprises scanning light over the wafers and generating output responsive to light from the wafers detected by the at least one wafer inspection tool during the scanning;

identifying abnormal variation in the inspection results by comparing the inspection results generated at different times to each other, wherein the inspection results that are compared comprise one or more characteristics of one or more images generated by the at least one wafer inspection tool for the wafers, and wherein said comparing comprises analyzing trends in the inspection results by generating a trend chart that shows values for the inspection results as a function of time and monitoring the trend chart for the abnormal variation defined as a deviation in the inspection results in the trend chart that exceeds a predetermined acceptable tolerance for one of the one or more characteristics of the one or more images; and determining if the abnormal variation is attributable to the wafers, the wafer inspection recipe, or one or more of the at least one wafer inspection tool thereby determining if the wafer inspection recipe is stable over time, wherein said determining comprises comparing the inspection results for at least two of the wafers generated by the same one of the at least one wafer inspection tool, and wherein the at least two of the wafers comprise wafers at different layers processed using different fabrication processes.

14. A system configured to monitor stability of a wafer inspection recipe over time, comprising:

at least one wafer inspection tool configured to generate inspection results by performing a wafer inspection recipe on wafers at different points in time, wherein generating the inspection results comprises scanning light over the wafers and generating output responsive to light from the waters detected by the at least one wafer inspection tool during the scanning; and a computer subsystem configured for:

collecting the inspection results over time, Wherein said collecting comprises storing the inspection results with information for identities of the wafers, the wafer inspection recipe, the at least one wafer inspection tool, and time that the wafer inspection recipe was performed corresponding to the inspection results;

identifying abnormal variation in the inspection results by comparing the inspection results generated at different times to each other, wherein the inspection results that are compared comprise one or more characteristics of one or more images generated by the at least one wafer inspection tool for the wafers, and wherein said comparing comprises analyzing trends in the inspection results by generating a trend chart that shows values for the inspection results as a function of time and monitoring the trend chart for the abnormal variation defined as a deviation in the inspection results in the trend chart that exceeds a predetermined acceptable tolerance for one of the one or more characteristics of the one or more images; and determining if the abnormal variation is attributable to the wafers, the wafer inspection recipe, or one or more of the at least one wafer inspection tool thereby determining if the wafer inspection recipe is stable over time, wherein said determining comprises comparing the inspection results for at least two of the wafers generated by the same one of the at least one wafer inspection toot, and wherein the at least two of the wafers comprise wafers at different layers processed using different fabrication processes.

15. The system of claim 14, wherein the inspection results that are compared in the identifying step are produced prior to performing defect detection for the wafers in the wafer inspection recipe.

16. The system of claim 14, wherein the inspection results that are compared in the identifying step further comprise one or more characteristics of defects detected on the wafers by the wafer inspection recipe.

17. The system of claim 14, wherein the inspection results that are compared in the identifying step further comprise one or more characteristics of defect classification results produced by the wafer inspection recipe.

18. The system of claim 14, wherein comparing the inspection results to each other in the identifying step further comprises determining one or more characteristics of the inspection results that are not generated by the wafer inspection recipe and comparing the one or more characteristics of the inspection results generated at the different times to each other.

19. The system of claim 14, wherein said collecting is performed periodically as a function of time.

20. The system of claim 14, wherein said collecting further comprises storing the inspection results generated by two or more of the at least one wafer inspection tool in the same computer-readable storage medium.

21. The system of claim 14, Wherein said determining further comprises comparing the inspection results for at least two of the wafers generated by different ones of the at least one wafer inspection tool.

22. The system of claim 14, wherein said collecting is performed during a production process in which one or more of the fabrication processes are performed on the wafers.

23. The system of claim 14, wherein the at least one wafer inspection tool is at least one optical wafer inspection tool.

24. The system of claim 14, wherein said collecting, said identifying, and said determining are performed automatically.

25. The system of claim 14, wherein the computer subsystem is not part of any of the at least one wafer inspection tool.

* * * * *